United States Patent [19]

Sattelmeyer

[11] Patent Number: 4,699,832

[45] Date of Patent: Oct. 13, 1987

[54] REINFORCED RUBBER MIXTURES, A PROCESS FOR THEIR PREPARATION AND THEIR USE

[75] Inventor: Richard Sattelmeyer, Wiesbaden, Fed. Rep. of Germany

[73] Assignee: Hoechst Aktiengesellschaft, Frankfurt am Main, Fed. Rep. of Germany

[21] Appl. No.: 844,808

[22] Filed: Mar. 27, 1986

[30] Foreign Application Priority Data

Mar. 29, 1985 [DE] Fed. Rep. of Germany ....... 3511549
Feb. 14, 1986 [DE] Fed. Rep. of Germany ....... 3604744

[51] Int. Cl.$^4$ ........................ F16L 11/04; B32B 25/00; C08L 61/10
[52] U.S. Cl. ..................................... 428/36; 152/151; 248/560; 285/292; 474/271; 524/507; 524/508; 524/509; 524/511; 525/130; 525/131; 525/133; 525/139; 525/141
[58] Field of Search ............... 525/130, 131, 133, 139, 525/141; 524/507, 508, 509, 511; 428/36; 152/151; 285/292; 248/560; 424/271

[56] References Cited

U.S. PATENT DOCUMENTS 3,586,735 6/1971 Giller et al. .................. 525/139 X
3,652,468 3/1972 Schwab et al. ................ 525/130
4,200,556 4/1980 Robinson et al. ............. 525/139 X
4,383,072 5/1983 Thiel et al. ................... 524/432

Primary Examiner—Theodore E. Pertilla
Attorney, Agent, or Firm—Bierman and Muserlian

[57] ABSTRACT

A reinforced rubber mixture composed of (A) at least one natural, styrene/butadiene, polybutadiene, polyisoprene, transpolyoctenylene, ethylene/propylene/diene terpolymer and butyl rubber, (B) at least one phenol novolak resin and/or reactive polyphenol, (C) curing agents and, if appropriate, (D) customary additives, wherein the rubber mixture contains, as an additional component (E), at least one polar, chlorine-free rubber in the form of nitrile rubber having a nitrile content of at least 32% or polyurethane rubber in a proportion by weight of 1 to 49% by weight, relative to the total amount of rubber. Process for the preparation thereof and the use of the reinforced rubber mixtures for the production of industrial rubber goods, in particular for the production of antivibration units, rubber sleeves, coatings, conveyor belts and tires.

20 Claims, No Drawings

REINFORCED RUBBER MIXTURES, A PROCESS FOR THEIR PREPARATION AND THEIR USE

It is part of the state of the art to reinforce mixtures of natural and/or synthetic rubber by the addition of curing synthetic resins, in particular phenolic resins. In the preparation of the mixtures, but preferably during vulcanization, the resins added pass over into the cross-linked state and thus improve some important mechanical properties of the vulcanized rubber, for example the hardness and the stress values. In general, the phenolic resins with a reinforcing action which are used are products of the novolak type, ie. thermoplastic, fusible resins which can be causied to crosslink by adding curing agents. The curing agents employed are substances which split off formaldehyde or react via methylene or methylol groups, such as hexamethylenetetramine and partially or completely etherified melamine and urea resins containing methylol groups. Resin-reinforced rubber mixtures based on natural rubber, styrene/butadiene rubber, polybutadiene rubber and other synthetic rubber types can be prepared in this manner.

If nitrile rubber is taken as the elastomer base, when an unmodified novolak based on an unsubstituted phenol is employed, the result of curing with 10% of hexamethylenetetramine, relative to the resin/curing agent mixture, in an amount of this curing agent which is, in general, customarily used in reinforcing rubber, is a markedly poorer reinforcing effect than if lower dosages, for instance dosages half as great, of the curing agent are used. Other criteria must, therefore, be responsible for achieving an optimum reinforcing action in nitrile rubber.

U.S. Pat. No. 4,383,072 discloses a leather-hard rubber mixture which can be used for the preparation of a so-called "laminated profile", which can be produced by the joint extrusion and vulcanization of two different qualities of rubber. The leather-hard mixture is composed of 20 to 50 parts by weight of a polar rubber which splits off acid groups under the conditions of vulcanization, such as polychloroprene (CR), chlorosulfonated polyethylene (CSM) or chlorinated polyethylene, and 60 to 80 parts by weight of a nonpolar rubber which does not split off these groups, for example natural rubber or butadiene rubber. Nitrile rubber is also described as a nonpolar type of rubber in the publication. The addition of the acid-donating, chlorine-containing rubbers mentioned is necessary to achieve particular desired properties, such as freedom from pores, hardness, toughness and resistance to splintering. These mixtures are therefore limited to a narrow specialized field; they cannot, however, be employed for the production of many industrial rubber goods, for example tires.

It has been mentioned, in a publication issued by the Hooker Chemical Corporation, USA, entitled "Durez Resins for the Rubber Industry", 1968 edition, that the replacement of part of an SBR rubber by acrylonitrile rubber in rubber mixtures which have been reinforced with phenolic resins but not filled with carbon black results in a higher hardness and better stress values. The acrylonitrile rubber employed in accordance with this literature reference is a type containing 31% of acrylonitrile.

It has now been found, surprisingly, that, in the vulcanization of mixtures based on nonpolar rubbers, for example natural rubber or styrene/butadiene rubber, reinforcing phenolic resin systems exert a substantially higher reinforcing effect in the presence of chlorine-free, polar polymers, ie. a rubber such as nitrile rubber, specifically containing at least 32% of acrylonitrile, or polyurethane rubber, than if the polar types of rubber are absent or if types of nitrile rubber containing up to 31% of acrylonitrile are employed.

The invention relates to a reinforced rubber mixture composed of (A) at least one natural, styrene/butadiene, polybutadiene, polyisoprene, trans-polyoctenylene, ethylene/propylene/diene terpolymer and butyl rubber, (B) at least one novolak resin and/or reactive polyphenol, (C) curing agents and, if appropriate, (D) customary additives, wherein the rubber mixture contains, as an additional component (E), at least one polar, chlorine-free rubber in the form of nitrile rubber having a nitrile content of at least 32% or polyurethane rubber, in a proportion by weight of 1 to 49, preferably 2 to 39 and particularly 3 to 30, % by weight, relative to the total amount of rubber.

By means of the invention it is now possible to prepare, starting from a base of natural rubber and/or other nonpolar types of rubber, rubber mixtures which have an optimum resin crosslinking and which, because of the addition of polar, chlorine-free types of rubber and a reinforcing resin system, exhibit even higher degrees of hardness and stress values than if the reinforcing resin system were used on its own. The fact that it is possible to increase the reinforcing effect on a rubber mixture, for example without increasing the proportions of the components having a reinforcing action customarily employed hitherto, such as carbon black or phenolic resin systems, or without changing the type of reinforcing component, for example the use of finely divided carbon black, which effects greater reinforcement, is unexpected and has not been known hitherto.

Nor could it have been expected that the addition of chlorine-containing polymers, such as, for example, chlorosulfonated polyethylene, would give no reinforcing effect at all or, as in the case of polychloroprene, would give a markedly lower reinforcement than nitrile rubber.

The reinforcing effect according to the invention thus does not depend on the chlorine content and the acid liberation of the rubber components added, since purely chlorine-free polymers, for example nitrile and polyurethane rubbers, effect the high reinforcement desired, but depend, for example, on the acrylonitrile content in a nitrile rubber.

Advantages accruing are, therefore, possible means of preparing a rubber mixture of high hardness using smaller amounts of carbon black than are used in the present procedure. However, a reduction in the amount of carbon black, which, in the vulcanized rubbers having a high degree of reinforcement hitherto customary, must generally be distinctly more than 60 parts by weight, relative to 100 parts by weight of rubber, means a reduction in the energy required in the mixing process and better processability, for example in extrusion. A reduction in the amount of carbon black therefore also effects, however, a reduction in the weight of corresponding finished units or components of a finished product, which affords advantages, for example in the case of automotive tires.

The invention also relates to a process for the preparation of the reinforced rubber mixtures and to their use.

Examples of suitable types of rubber (A) which can be reinforced are natural rubber (NR), styrene/butadiene rubber (SBR), polybutadiene, polyisoprene, trans-polyoctenylene/butyl rubber, ethylene/propylene/diene terpolymer rubber or mixtures thereof such as are generally used in the tire industry or for the production of industrial rubber goods. Styrene/butadiene rubber and natural rubber or mixtures of these types of rubber with minor amounts of other types of rubber are preferred. They can be used in any desired source form, for example in the form of bales or powders and also, for example, together with carbon black.

The component (E) employed in the mixture according to the invention is at least one polar, chlorine-free rubber, for example nitrile rubber (NBR) (copolymer of acrylonitrile with butadiene or isoprene) or polyurethane rubber (PU). The use of NBR rubber, ie. a copolymer composed predominantly of acrylonitrile and butadiene and containing at least 32%, and, in general, not more than 60, preferably not more than 50, % by weight of acrylonitrile, is particularly advantageous. Mixtures of the various types of rubber, for example of the various nitrile rubbers, can also be employed.

The polar, chlorine-free rubber can be present in a customary source form and, in the process according to the invention, can either be incorporated directly into the rubber mixture or can be present as a modifying agent in the reinforcing resin or in another component of the mixture, for example a masterbatch. As a modifying agent for the resin, it can, for example, be physically mixed into the latter in a known manner or can be added on to the reinforcing resin by means of a chemical bond.

In general, resins (B) which are suitable for reinforcing rubber are phenol novolaks or other active polyphenols or polynuclear phenols, such as resorcinol, diphenylolpropane or diphenylolmethane or naphthols and analogous compounds. Examples of particularly suitable novolak resins are those obtained in an acid medium from phenol and/or polyhydric mononuclear or polynuclear phenols, such as resorcinol, bisphenols, for example diphenylolpropane and/or diphenylolmethane, or monohydric or polyhydric phenols which are substituted by a hydrocarbon group, such as alkylphenols or aralkylphenols having, for example, 1 to 20, preferably 4 to 18, carbon atoms in the substituent, such as tert.-butylphenol, octylphenol, nonylphenol, cashew nutshell oil, styrenated phenol or phenol modified with fatty acids, such as linseed oil fatty acids, or phenylphenol, and aldehydes, such as acetaldehyde, but preferably formaldehyde. Phenolic resins modified with inorganic constituents can also be employed to reinforce rubber, for example types which have been modified with silicon, aluminum or boron compounds. In addition, the novolaks can contain plasticizing components, such as polyethylene glycols, tall oil or other customary plasticizers. In principle, it is also possible to use novolaks formed solely from phenols substituted with hydrocarbon groups, carrying an alkyl group having 1 to 20 carbon atoms; this applies especially to phenols containing an alkyl radical having, for example, 1 to 4 carbon atoms in the m-position relative to the phenolic hydroxyl group. Novolaks formed only from phenols containing a substituent in the ortho-position or para-position are, however, only of limited suitability, since they are less readily curable. These phenols are therefore preferably used as mixtures with trifunctional phenols, such as m-cresol, but especially with phenol. The term "trifunctional phenols" denotes phenols in which the ortho-positions and para-positions relative to the phenolic hydroxyl groups are accessible for reactions with aldehydes. The phenol component of the novolaks can also contain, as additives, phenols containing several alkyl groups, the amount thereof being, for example, up to 20 mole %. For industrial use, novolaks formed from phenol and mixtures of phenol and phenols substituted by a hydrocarbon group and having 4 to 18 carbon atoms in the substituent, including cashew nutshell oil, are preferred. The proportion of substituted phenols in the novolak can vary, but the novolak should still be curable. In general, the proportion of non-trifunctional phenols in the total content of phenols is not higher than 80 mole %, preferably not higher than 65 mole %.

The curing agents (C) used can be any desired compounds which split off formaldehyde and/or contain free or etherified methylol groups, for example amine resins, such as urea resins or benzoguanamine resins. Preferred compounds are, however, hexamethylenetetramine (described as "hexa" in the following text) and melamine resins, the latter in the form of polynuclear products which are not etherified or are partly or substantially etherified and, if appropriate, have a higher degree of condensation. The degree of condensation of the aldehyde resins, in particular formaldehyde resins, and their content of free methylol groups can vary within wide limits. The free methylol groups can be etherified with monohydric alcohols having 1 to 12, preferably 1 to 8, carbon atoms, such as methanol, ethanol, the various propanols, butanols, hexanols, octanols, such as ethylhexanol and n-octanol, nonanols and dodecyl alcohol. Hexamethoxymethylmelamine, for example, finds a wide use.

The optimum amounts of curing agent required for curing the novolak resins must be determined in preliminary trials, which are easy to carry out. In general, about 2 to 60, preferably 5 to 50, % by weight of melamine resin or 2 to 30, preferably 2 to 25, % by weight of hexamethylenetetramine, relative to the novolak, are used.

Customary additives (D) are fillers, vulcanizing agents, accelerators, activators and processing aids.

The fillers used can be not only activated carbon blacks and silicas, but also kaolins, chalk and/or other customary materials, including also pigments. The use of carbon black is particularly preferred. In some cases (for example in transparent mixtures) the use of fillers is wholly or largely dispensed with. The processing aids used can be oils or plasticizers, and the amount thereof by weight needed to achieve particular effects can be over 10% by weight, relative to the rubber employed.

Vulcanization can be carried out without sulfur and with vulcanization resins. Vulcanization in the presence of sulfur is preferred, however. Its progress can be adjusted to suit practical requirements by choosing suitable accelerators, activators and regulators which are customary in the technology of rubber. It is also advantageous to add anti-aging agents in order to improve the properties of the vulcanized rubbers.

The starting mixtures employed in accordance with the invention can be prepared in a customary manner in internal mixers or on mixing rolls. When the resins are incorporated, it can be advantageous if the mixing temperature in some stage of the preparation by mixing exceeds the melting point of the resins, but fairly high degrees of hardness can, if appropriate, also be achieved by formulations in which the temperature of mixing remains below the melting point after the resins have been added. It is also important that the curing agents should be incorporated in such a way that a premature self-condensation reaction or a premature reaction with the novolak to be cured does not result. This is possible if the curing agents are incorporated at the end of the mixing process at temperatures which are not too high (in general at 80 to 120° C.).

The vulcanized rubbers obtained in accordance with the invention can be used, for example, as industrial rubber goods, such as anti-vibration units, rubber sleeves, coatings, conveyor belts and also tires. In this respect, the mixtures according to the invention can also be used in the plies, which must have a good adhesion to inserted fabrics or braids. The adhesion can be improved by using additionally adhesion promoters, such as cobalt or other metal compounds and/or combinations of silica, resorcinol and a curing agent.

The tests described below serve to illustrate the composition and the properties of the rubber mixtures according to the invention. Series of tests are carried out using formulations free from carbon black and containing carbon black, a masterbatch composed of the corresponding rubber containing 50 parts by weight of carbon black, relative to 100 parts by weight of rubber, being used in each case for the formulations containing carbon black. The further components were then added to the rubber or to the masterbatch in the mixing process, in the sequence: stearic acid, zinc oxide, anti-aging agent, sulfur and phenolic resin, at temperatures between approx. 90 and 100° C., followed by the curing agent and the accelerator at temperatures below 100° C.

After vulcanization, which was carried out under the conditions indicated for the particular series of tests, the test specimens obtained were examined in respect of the following properties by the methods customary in practice:
Breaking strength, elongation at break and stress values (at an elongation of 10% to 300%) as specified in DIN 53,504, Shore A hardness as specified in DIN 53,505 and resilience as specified in DIN 53,512.

The rubber mixtures mentioned in Tables 1 to 10 contain, as well as the components indicated therein, the following customary additives (in parts by weight):
1.5 parts of stearic acid
5 parts of zinc oxide
1 part of N-isopropyl-N-phenyl-p-phenylenediamine*
1 part of 2,2,4-trimethyl-1,2-dihydroquinoline*
2.5 parts of sulfur
0.9 part of benzothiazole-2-cyclohexylsulfeneamide (a)**
0.3 part of tetramethylthiuram monosulfide (b)**
* as an anti-aging agent
** as an accelerator As a variation from this, in test series 5 and 6 the accelerators (a) or (b) were employed in amounts of 1 part and 0.2 part respectively, and 2 parts of sulfur, and, in test series 7, only 1 part of phenyl-β-naphthylamine was employed as the anti-aging agent.

In the examples, the quantity data relate in each case to parts by weight and percentages by weight.

EXAMPLES

Test series 1 (Example 1 and Comparisons A, B and C)

NR and NBR rubber containing phenol novolak and hexa, but no carbon black

The formulation, according to the invention, of Example 1 contains natural rubber, NBR rubber and a reinforcing resin containing hexa as the curing agent, whereas the comparison tests A, B and C contain, respectively, natural rubber alone, natural rubber and resin containing a curing agent and natural rubber and nitrile rubber. The resin used was a commercially available phenol novolak having a melting range between 60 and 80° C. (capillary method of DIN 53,736) and a viscosity at 20° C. of 170 to 220 mPa.s (40% solution in ethylene glycol monoethyl ether), and the nitrile rubber used was a commercially available product containing 34% of acrylonitrile.

It can be seen from Table 1 that both the added nitrile rubber in Comparison C and the added resin in Comparison B effects, in a natural rubber mixture, an increase in the hardness and the stress values compared with Comparison A, in which natural rubber alone was employed, but in both cases the values of Example 1 are not achieved by a long way. As a result of the resin added in Comparison B there is an increase, for example, in the stress values at 10% and 50% elongation from 0.6 and 0.8 mPa, respectively, to 0.9 and 1.5 mPa, respectively, compared with pure natural rubber, and in the hardness from 40 to 44 units. Surprisingly, however, in Example 1 there is an increase to 2.1 and 3.2 mPa, respectively, in the corresponding stress values and to 58 in the hardness, compared with Comparison A.

Test series 2 (Examples 2 to 5, Comparisons D and E)

NR and NBR rubber containing a phenol novolak and hexa, and filled with carbon black The phenol novolak and the rubber grades of test series 1 were employed.

In comparison with non-reinforced and resin-containing mixtures D and E, respectively, the formulations, according to the invention, of Examples 2 to 5 exhibit a result analogous to that of test series 1. The highest reinforcing effect at 20 parts by weight of added resin (resin +curing agent) is found within the range from 5 to 10% content of nitrile rubber in the elastomer mixture, whereas at a 2.5% content of nitrile rubber, although high hardness values are obtained, there is no increase in the stress values. The results obtained when using a nitrile rubber-modified phenolic resin (Example 5) are virtually no different from those obtained when nitrile rubber and phenolic resin are mixed in separately (Example 4).

Test series 3 (Example 6 and Comparisons F to H)

NR and NBR or CR rubber containing Novolak and hexa and filled with carbon black In this series of tests, a commercially available novolak having a melting range of 83 to 88° C. (capillary method of DIN 53,736) and a viscosity at 20° C. of 170 to 250 mPa.s (40% solution in ethylene glycol monoethyl ether) was used. In Example 6, compared with Comparison tests F and G, there was a replacement, in accordance with the invention, of an amount of 5 parts by weight of natural rubber by a commercially available NBR rubber from Example 1 containing 34% of acrylonitrile. In Comparison test H, 5 parts by weight of a commercially available chloroprene rubber (Neoprene AC soft, made by Du Pont) was employed instead of 5 parts by weight of natural rubber. The dosages of resin and curing agent were reduced to one half, compared with test series 1 and 2.

In Comparison test G, the reinforcing effect of the resin system in comparison with the resin-free formulation F is shown in the increased stress values and the hardness. Results only insignificantly better are obtained with comparison mixture H, which shows the low effectiveness of the added polychloroprene on the reinforcement. The test values in Example 6, where nitrile rubber is used in the rubber mixture, are, however, markedly higher both for the hardness and for the stress values.

Test series 4 (Examples 7 and 8 and Comparisons I and J)

NR and NBR rubber/PU or CSM rubber containing phenol novolak and melamine resin, filled with carbon black 1 part by weight of benzoic acid was also used as an additional accelerator for crosslinking the resins. In addition to a commercially available nitrile rubber according to Example 1 containing 34% of acrylonitrile, in Example 8 a commercially available polyurethane rubber (Desmocoll ® 400 made by Bayer AG) was also used as the polar rubber. The Comparison test I contains no polar rubber, whereas in comparison test J 5 parts by weight of natural rubber have been replaced by chlorosulfonated polyethylene (Hypalon ®20 made by Du Pont). The markedly higher reinforcing effect of the formulations according to the invention compared with the Comparison tests I and J can also be seen in these examples containing another curing agent. Compared with an exclusively natural rubber formulation corresponding to Comparison test I, the addition of chlorosulfonated polyethylene in accordance with Comparison test J produces no reinforcing effect.

Test series 5 (Example 9 and Comparisons K to M)

SBR and NBR rubber containing phenol novolak and hexa, filled with carbon black

A commercially available styrene/butadiene rubber containing 23.5% by weight of combined styrene (BUNA ®1620 made by Hüls AG) was in the form of a masterbatch containing carbon black (100:50 parts by weight). The phenolic resin used was the same novolak as in test series 3, and the nitrile rubber used was a commercially available type containing 34% by weight of acrylonitrile as in the earlier examples. When the nitrile rubber is added to the SBR rubber a comparison of Comparison test L with Comparison test K shows an increase in the stress values, but no increase in hardness. In Comparison M, the addition of the reinforcing resin to the SBR rubber results in an increase in the stress values, particularly at low elongations, and to a marked increase in hardness. However, compared with Comparisons K, L and M, Example 9 according to the invention, in which nitrile rubber and a reinforcing resin system are jointly employed in the SBR rubber, exhibits a substantially greater increase in the stress values and hardness of the vulcanized rubbers. The values determined reach surprisingly high figures.

Test series 6 (Examples 10 and 11 and Comparisons L, N and O)

SBR and NBR rubber/PU rubber containing phenol novolak or resorcinol and hexa, filled with carbon black As shown in Example 10, the joint use of NBR rubber (34% nitrile content) and the reinforcing resin system consisting of resorcinol and hexa results in markedly higher stress values and hardness values than the sole use of one of these two components in the SBR rubber according to Comparison tests L and N. Furthermore, Example 11 shows that the use of polyurethane rubber instead of NBR rubber without added resin in accordance with Comparison O produces only a slight reinforcing effect, but produces a high reinforcing effect if resin is added at the same time.

Test series 7 (Example 12 and Comparisons P to S)

NR and NBR rubber containing phenol novolak and hexa, with carbon black and silica as the filler The same NBR rubber and phenol novolak as in test series 3 were employed in this series of tests, and precipitated silica was also used as a filler in addition to carbon black.

Whereas replacing 5 parts by weight of natural rubber by the NBR rubber in Comparison S produces only slight increases, or none at all, in hardness and stress values, compared with Comparison P, and adding only a phenolic resin system in Comparison S results in a marked increase in the test values, the mixture, according to the invention, of Example 12 exhibits stress values (up to 100% elongation) which are 30% higher than those of Comparison S, and a hardness which is 13 units higher.

Test series 8 (Examples 13, 14 and 15 and Comparisons T, U and V)

NR and NBR rubber containing at least 32% of acrylonitrile together with phenol novolak and hexa and filled with carbon black In accordance with the results of T and U reinforcement without added resin is low; in test V, where phenol novolak is used, it is markedly higher. However, the addition of NBR rubber results in an even higher reinforcing effect, running parallel to the increase in acrylonitrile content. Thus, for example, the hardness of 79 units obtained in test V rises by 8 units to 87 if NBR rubber containing 32% of acrylonitrile is used and even rises by 12 units to 91 if NBR rubber containing 38% of acrylonitrile is used. Correspondingly good values are also obtained in the stress values at 10% elongation using the process according to the invention.

Test series 9 and 10 (Examples 16–21 and Comparisons W–Z)

NR and NBR rubber containing more than 29% of acrylonitrile together with phenol novolak and hexa or hexamethoxymethylmelamine (test series 10) and filled with carbon black The results show that a marked increase in the reinforcing effect can take place if an NBR rubber containing 32% or more of acrylonitrile is added. Although varying changes in the properties, stress values and hardness can result, depending on the curing agent system, it is found in general that an increase in the effect begins when the NBR rubber contains 32% of acrylonitrile and that a significant increase in the reinforcing effect takes place as the acrylonitrile content increases further. The mixing ratios of the various test series and the test results obtained are listed in Tables 1 to 10 below.

TABLE 1

| | Test series 1 | | | |
| | Example | Comparison test | | |
| | 1 | A | B | C |
| Natural rubber | 90 | 100 | 100 | 90 |
| NBR rubber | 10 | — | — | 10 |
| Phenol novolak | 18 | — | 18 | — |
| Hexa | 2 | — | 2 | — |
| Vulcanization 145° C./minutes | 40 | 30 | 40 | 20 |

TABLE 1-continued

| | Test series 1 | | | |
|---|---|---|---|---|
| | Example | Comparison test | | |
| | 1 | A | B | C |
| Test results: | | | | |
| Breaking strength (MPa) | 16.7 | 9.4 | 16.9 | 13.1 |
| Elongation at break (%) | 332 | 350 | 334 | 341 |
| Stress value 10% elongation (MPa) | 2.1 | 0.6 | 0.9 | 0.7 |
| Stress value 50% elongation (MPa) | 3.2 | 0.8 | 1.5 | 1.1 |
| Stress value 100% elongation (MPa) | 4.7 | 1.2 | 2.6 | 1.6 |
| Stress value 200% elongation (MPa) | 8.8 | 2.1 | 6.7 | 3.4 |
| Stress value 300% elongation (MPa) | 14.5 | 3.8 | 13.7 | 8.8 |
| Resilience at 23° C. (%) | 45 | 37 | 38 | 31 |
| Shore hardness A at 23° C. (°) | 58 | 40 | 44 | 40 |

TABLE 2

| | Test series 2 | | | | | |
|---|---|---|---|---|---|---|
| | Example | | | | Comparison test | |
| | 2 | 3 | 4 | 5 | D | E |
| Natural rubber | 97.5 | 95 | 90 | 90 | 100 | 100 |
| NBR rubber | 2.5 | 5 | 10 | — | — | — |
| Carbon black N 330 | 50 | 50 | 50 | 50 | 50 | 50 |
| Phenol novolak | 18 | 18 | 18 | 9 | — | 18 |
| Modified phenol novolak* | — | — | — | 19 | — | — |
| Hexa | 2 | 2 | 2 | 2 | — | 2 |
| Vulcanization 145° C./minutes | 30 | 30 | 30 | 30 | 20 | 30 |
| Test results: | | | | | | |
| Breaking strength (MPa) | 15.5 | 12.9 | 14.2 | 13.6 | 21.8 | 18.4 |
| Elongation at break (%) | 277 | 153 | 219 | 208 | 312 | 285 |
| Stress value 10% elongation (MPa) | 3.9 | 6.1 | 5.2 | 5.2 | 1.4 | 3.6 |
| Stress value 50% elongation (MPa) | 5.0 | 7.8 | 6.8 | 6.7 | 2.8 | 5.1 |
| Stress value 100% elongation (MPa) | 6.4 | 10.0 | 8.8 | 8.5 | 5.7 | 7.5 |
| Stress value 200% elongation (MPa) | 10.9 | — | 13.2 | 13.4 | 13.5 | 13.3 |
| Resilience at 23° C. (%) | 37 | 34 | 30 | 30 | 45 | 39 |
| Shore hardness A at 23° C. (°) | 92 | 96 | 96 | 96 | 68 | 84 |

*The phenol novolak was modified with NBR rubber and was composed of 9 parts by weight of phenol novolak and 10 parts by weight of NBR rubber

TABLE 3

| | Test series 3 | | | |
|---|---|---|---|---|
| | Example | Comparison test | | |
| | 6 | F | G | H |
| Natural rubber | 95 | 100 | 100 | 95 |
| NBR rubber | 5 | — | — | — |
| chloroprène rubber | — | — | — | 5 |
| Carbon black N 330 | 50 | 50 | 50 | 50 |
| Phenol novolak | 9 | — | 9 | 9 |
| Hexa | 1 | — | 1 | 1 |
| Vulcanization 145° C./minutes | 20 | 20 | 20 | 20 |
| Test results: | | | | |
| Breaking strength (MPa) | 14.9 | 22.2 | 16.5 | 14.2 |
| Elongation at break (%) | 240 | 357 | 297 | 263 |
| Stress value 10% elongation (MPa) | 2.7 | 0.9 | 1.9 | 2.1 |
| Stress value 50% elongation (MPa) | 4.6 | 1.9 | 3.0 | 3.2 |
| Stress value 100% elongation (MPa) | 7.1 | 4.0 | 4.8 | 5.1 |
| Stress value 200% elongation (MPa) | 12.7 | 10.7 | 10.3 | 10.4 |
| Resilience at 23° C. (%) | 30 | 39 | 39 | 37 |
| Shore hardness A at 23° C. (°) | 87 | 63 | 81 | 83 |

TABLE 4

| | Test series 4 | | | |
|---|---|---|---|---|
| | Example | | Comparison test | |
| | 7 | 8 | I | J |
| Natural rubber | 95 | 95 | 100 | 95 |
| NBR rubber | 5 | — | — | — |
| PU rubber | — | 5 | — | — |
| Chlorosulfonated polyethylene | — | — | — | 5 |
| Carbon black N 330 | 50 | 50 | 50 | 50 |
| Phenol novolak | 14 | 14 | 14 | 14 |
| Hexamethoxymethylmelamine | 6 | 6 | 6 | 6 |
| Vulcanization 145° C./minutes | 60 | 60 | 60 | 60 |
| Test results: | | | | |
| Breaking strength (MPa) | 10.2 | 10.9 | 11.3 | 11.3 |
| Elongation at break (%) | 122 | 166 | 189 | 172 |
| Stress value 10% elongation (MPa) | 5.2 | 5.6 | 4.5 | 3.9 |
| Stress value 50% elongation | 6.7 | 6.0 | 5.3 | 5.4 |
| Stress value 100% elongation (MPa) | 9.1 | 8.0 | 7.0 | 7.4 |
| Resilience at 23° C. (%) | 33 | 35 | 39 | 36 |
| Shore hardness A at 23° C. (°) | 94 | 95 | 91 | 91 |

TABLE 5

| | Test series 5 | | | |
|---|---|---|---|---|
| | Example | Comparison test | | |
| | 9 | K | L | M |
| SBR rubber | 95 | 100 | 95 | 100 |
| NBR rubber | 5 | — | 5 | — |
| Carbon black N 330 | 50 | 50 | 50 | 50 |
| Phenol novolak | 9 | — | — | 9 |
| Hexa | 1 | — | — | 1 |
| Vulcanization 155° C./minutes | 30 | 30 | 30 | 30 |
| Test results: | | | | |
| Breaking strength (MPa) | 22.6 | 23.4 | 20.3 | 22.8 |
| Elongation at break (%) | 246 | 306 | 216 | 289 |
| Stress value 10% elongation (MPa) | 4.0 | 0.8 | 1.4 | 2.5 |
| Stress value 50% elongation (MPa) | 6.1 | 2.3 | 3.6 | 3.8 |
| Stress value 100% elongation (MPa) | 9.8 | 4.7 | 7.8 | 6.7 |
| Stress value 200% elongation (MPa) | 18.7 | 13.4 | 18.3 | 15.5 |
| Resilience at 23° C. (%) | 33 | 38 | 34 | 37 |
| Shore hardness A at 23° C. (°) | 91 | 73 | 72 | 84 |

TABLE 6

| | Test series 6 | | | | |
|---|---|---|---|---|---|
| | Example | Comparison | | Example | Comparison |
| | 10 | L | N | 11 | O |
| SBR rubber | 95 | 95 | 100 | 95 | 95 |
| NBR rubber | 5 | 5 | — | — | — |

TABLE 6-continued

|  | Test series 6 | | | | |
|---|---|---|---|---|---|
|  | Example 10 | Comparison L | Comparison N | Example 11 | Comparison O |
| PU rubber | — | — | — | 5 | 5 |
| Carbon black N 330 | 50 | 50 | 50 | 50 | 50 |
| Phenol novolak | — | — | — | 9 | — |
| Resorcinol | 6 | — | 6 | — | — |
| Hexa | 4 | — | 4 | 1 | — |
| Vulcanization 155° C./minutes | 40 | 30 | 40 | 30 | 30 |
| Test results: | | | | | |
| Breaking strength (MPa) | 21.1 | 20.3 | 23.5 | 20.3 | 23.7 |
| Elongation at break (%) | 249 | 216 | 301 | 254 | 269 |
| Stress value 10% elongation (MPa) | 3.1 | 1.4 | 2.1 | 2.7 | 1.3 |
| Stress value 50% elongation (MPa) | 4.9 | 3.6 | 3.6 | 4.5 | 2.9 |
| Stress value 100% elongation (MPa) | 8.2 | 7.8 | 6.6 | 8.1 | 6.5 |
| Stress value 200% elongation (MPa) | 16.9 | 18.3 | 15.2 | 16.4 | 17.1 |
| Resilience at 23° C. (%) | 37 | 34 | 39 | 35 | 35 |
| Shore hardness A at 23° C. (°) | 89 | 72 | 82 | 88 | 72 |

TABLE 7

|  | Test series 7 | | | |
|---|---|---|---|---|
|  | Example 12 | Comparison test P | Comparison test R | Comparison test S |
| Natural rubber | 95 | 100 | 95 | 100 |
| NBR rubber | 5 | — | 5 | — |
| Carbon black N 326 | 40 | 40 | 40 | 40 |
| Silica | 15 | 15 | 15 | 15 |
| Phenol novolak | 18 | — | — | 18 |
| Hexa | 2 | — | — | 2 |
| Vulcanization 145° C./minutes | 45 | 10 | 10 | 45 |
| Test results: | | | | |
| Breaking strength (MPa) | 14.0 | 22.9 | 20.0 | 14.9 |
| Elongation at break (%) | 237 | 452 | 454 | 341 |
| Stress value 10% elongation (MPa) | 3.6 | 0.6 | 0.7 | 1.9 |
| Stress value 50% elongation (MPa) | 5.1 | 1.3 | 1.3 | 3.1 |
| Stress value 100% elongation (MPa) | 7.6 | 2.2 | 2.2 | 5.3 |
| Stress value 200% elongation (MPa) | 11.9 | 6.1 | 5.4 | 11.7 |
| Resilience at 23° C. (%) | 37 | 41 | 34 | 38 |
| Shore hardness A at 23° C. (°) | 89 | 55 | 57 | 76 |

TABLE 8

|  | Test series 8 | | | | | |
|---|---|---|---|---|---|---|
|  | Example 13 | Example 14 | Example 15 | Comparison test T | Comparison test U | Comparison test V |
| Natural rubber | 90 | 90 | 90 | 100 | 90 | 100 |
| NBR rubber 32% of ACN* | 10 | — | — | — | — | — |
| NBR rubber 34% of ACN | — | 10 | — | — | — | — |
| NBR rubber 38% of ACN | — | — | 10 | — | 10 | — |
| Carbon black N 330 | 50 | 50 | 50 | 50 | 50 | 50 |
| Phenol novolak | 9 | 9 | 9 | — | — | 9 |
| Hexa | 1 | 1 | 1 | — | — | 1 |
| Vulcanization 145° C./minutes | 45 | 45 | 45 | 20 | 20 | 30 |
| Test results: | | | | | | |
| Breaking strength (MPa) | 15.5 | 15.6 | 15.4 | 21.6 | 18.7 | 18.4 |
| Elongation at break (%) | 198 | 203 | 213 | 266 | 244 | 279 |
| Stress value 10% elongation (MPa) | 2.1 | 2.3 | 2.5 | 1.0 | 1.0 | 1.6 |
| Stress value 50% elongation (MPa) | 4.8 | 5.3 | 5.3 | 2.7 | 3.0 | 3.1 |
| Stress value 100% elongation (MPa) | 8.2 | 8.6 | 8.3 | 6.1 | 6.2 | 6.8 |
| Stress value 200% elongation (MPa) | — | 15.3 | 14.5 | 15.8 | 14.9 | 14.2 |
| Resilience at 23° C. (%) | 35 | 34 | 32 | 51 | 38 | 50 |
| Shore hardness A at 23° C. (°) | 87 | 90 | 91 | 71 | 75 | 79 |

ACN = acrylonitrile content

TABLE 9

|  | Test series 9 | | | | |
|---|---|---|---|---|---|
|  | Example 16 | Example 17 | Example 18 | Comparison test W | Comparison test X |
| Natural rubber | 95 | 95 | 95 | 95 | 95 |
| NBR rubber 29% of ACN* | — | — | — | — | 5 |
| NBR rubber 30.5% of ACN | — | — | — | 5 | — |
| NBR rubber 32% of ACN | — | — | 5 | — | — |
| NBR rubber 34% of ACN | — | 5 | — | — | — |
| NBR rubber 38% of ACN | 5 | — | — | — | — |
| Carbon black N 330 | 50 | 50 | 50 | 50 | 50 |
| Phenol novolak | 18 | 18 | 18 | 18 | 18 |
| Hexa | 2 | 2 | 2 | 2 | 2 |
| Vulcanization 145° C./minutes | 45 | 45 | 45 | 45 | 45 |
| Test results: | | | | | |
| Breaking strength (MPa) | 13.8 | 13.3 | 14.7 | 13.1 | 13.3 |
| Elongation at break (%) | 185 | 182 | 193 | 187 | 180 |
| Stress value 10% elongation (MPa) | 4.3 | 3.6 | 2.9 | 2.5 | 2.7 |
| Stress value 50% elongation (MPa) | 6.8 | 6.2 | 5.5 | 4.7 | 5.1 |
| Stress value 100% elongation (MPa) | 8.7 | 8.6 | 8.7 | 7.6 | 8.1 |
| Stress value 200% elongation (MPa) | — | — | — | — | — |
| Resilience at 23° C. (%) | 41 | 40 | 39 | 41 | 40 |
| Shore hardness A at 23° C. (°) | 95 | 94 | 92 | 88 | 89 |

ACN = acrylonitrile content

TABLE 10

Test series 10

| | Example | | | Comparison test | |
|---|---|---|---|---|---|
| | 19 | 20 | 21 | Y | Z |
| Natural rubber | 95 | 95 | 95 | 95 | 95 |
| NBR rubber 29% of ACN* | — | — | — | — | 5 |
| NBR rubber 30.5% of ACN | — | — | — | 5 | — |
| NBR rubber 32% of ACN | — | — | 5 | — | — |
| NBR rubber 34% of ACN | — | 5 | — | — | — |
| NBR rubber 38% of ACN | 5 | — | — | — | — |
| Carbon black N 330 | 50 | 50 | 50 | 50 | 50 |
| Phenol novolak | 14 | 14 | 14 | 14 | 14 |
| Hexamethoxymethylmelamine | 6 | 6 | 6 | 6 | 6 |
| Vulcanization 145° C./minutes | 60 | 60 | 60 | 60 | 60 |
| Test results: | | | | | |
| Breaking strength (MPa) | 12.5 | 12.5 | 13.9 | 14.8 | 13.8 |
| Elongation at break (%) | 171 | 190 | 193 | 233 | 218 |
| Stress value 10% elongation (MPa) | 4.3 | 3.2 | 2.9 | 2.6 | 2.4 |
| Stress value 50% elongation (MPa) | 7.3 | 6.0 | 5.9 | 5.0 | 4.8 |
| Stress value 100% elongation (MPa) | 9.0 | 8.3 | 8.7 | 7.6 | 7.4 |
| Stress value 200% elongation (MPa) | — | — | — | 13.1 | 12.6 |
| Resilience at 23° C. (%) | 34 | 32 | 32 | 35 | 32 |
| Shore hardness A at 23° C. (°) | 95 | 92 | 90 | 89 | 89 |

ACN = acrylonitrile content

I claim:

1. A reinforced rubber mixture composed of (A) at least one natural, styrene/butadiene, polybutadiene, polyisoprene, transpolyoctenylene, ethylene/propylene/diene terpolymer and butyl rubber, (B) at least one phenol novolak resin or reactive polyphenol or both, (C) curing agents and in the optional presence of (D) customary additives, wherein the rubber mixture contains, as an additional component (E), at least one polar, chlorine-free rubber in the form of nitrile rubber having a nitrile content of at least 32% or polyurethane rubber in a proportion by weight of 1 to 49% by weight, relative to the total amount of rubber.

2. The rubber mixture as claimed in claim 1, wherein fillers, vulcanizing agents, accelerators, activators and processing auxiliaries are present as customary additives.

3. The rubber mixture as claimed in claim 1, wherein carbon black is used as a customary additive.

4. The rubber mixture as claimed in claim 1, wherein the polar rubber is present in amounts of 2 to 39% by weight.

5. The rubber mixture as claimed in claim 1, wherein a compound which splits off formaldehyde or methylene groups, an amine resin having free or etherified methylol groups or a mixture thereof is used as the curing agent for the resins.

6. The rubber mixture as claimed in claim 1, wherein condensation products formed from phenol, substituted phenols, polyhydric mononuclear or polynuclear phenols or mixtures thereof and aldehydes are used as novolak resins.

7. The rubber mixture as claimed in claim 6, wherein formaldehyde is used as aldehyde.

8. The rubber mixture as claimed in claim 1, wherein resorcinol or diphenylolpropane, diphenylolmethane or naphthols are used as reactive poly phenols.

9. A process for reinforcing a mixture composed of (A) at least one natural, styrene-butadiene, polybutadiene, polyisoprene, transpolyoctenylene, ethylene-propylenediene terpolymer and butyl rubber, (B) at least one phenol novolak resin or reactive polyphenol or both, (C) curing agents in the optional presence of (D) customary additives, which comprises incorporating into the rubber mixture of the components (A) to (D), as a further component, (E), at least one polar, chlorine-free rubber in the form of nitrile rubber having a nitrile content of at least 32% or polyurethane rubber in a proportion by weight of 1 to 49% by weight, relative to the total amount of rubber and vulcanizing the mixture.

10. The process as claimed in claim 9, wherein the nolvolak is incorporated either above or below its softening point or fusion temperature and is added jointly with, or seperately from, the curing agent.

11. The process as claimed in claim 9, wherein the curing agent is incorporated at the end of the mixing process at temperatures between 80° and 120° C.

12. The process as claimed in claim 9, wherein fillers, vulcanizing agents, accelerators, activators and processing auxiliaries are present as customary additives.

13. The process as claimed in claim 9, wherein carbon black is used as a customary additive.

14. The process as claimed in claim 9, wherein the polar rubber is present in amounts of 2 to 39% by weight.

15. The process as claimed in claim 14, wherein the polar rubber is present in amount of 3 to 30% by weight.

16. The process as claimed in claim 9, wherein a compound which splits off formaldehyde or methylene groups, an amine resin having free or etherified methylol groups or a mixture thereof is used as the curing agent for the resins.

17. The process as claimed in claim 9, wherein condensation products formed from phenol, substituted phenols, polyhydric mononuclear or polynuclear phenols or mixtures thereof and aldehydes are used as novolak resins.

18. The process as claimed in claim 9, wherein resorcinol or diphenylolpropane, diphenylolmethane or naphthols are used as reactive polyphenols.

19. Industrial rubber goods prepared from the vulcanized reinforced rubber mixtures as claimed in claim 1.

20. Rubber goods as claimed in claim 19 in the form of antivibration units, rubber sleeves, conveyor belts and tires.

* * * * *